(12) United States Patent
Dennehy et al.

(10) Patent No.: US 10,929,425 B2
(45) Date of Patent: *Feb. 23, 2021

(54) GENERATING DATABASE SEQUENCES IN A REPLICATED DATABASE ENVIRONMENT

(71) Applicant: INTERNATIONAL BUSINESS MACHINES CORPORATION, Armonk, NY (US)

(72) Inventors: Mark Dennehy, Dublin (IE); Robert Mooney, Kildare (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 197 days.

This patent is subject to a terminal disclaimer.

(21) Appl. No.: 15/800,174

(22) Filed: Nov. 1, 2017

(65) Prior Publication Data

US 2018/0052900 A1   Feb. 22, 2018

Related U.S. Application Data

(63) Continuation of application No. 13/939,723, filed on Jul. 11, 2013, now Pat. No. 9,846,733.

(51) Int. Cl.
*G06F 16/27* (2019.01)
*G06F 16/23* (2019.01)
*G06F 8/658* (2018.01)

(52) U.S. Cl.
CPC ............. *G06F 16/27* (2019.01); *G06F 16/23* (2019.01); *G06F 8/658* (2018.02)

(58) Field of Classification Search
CPC ........... G06F 16/27; G06F 16/23; G06F 8/658
See application file for complete search history.

(56) References Cited

U.S. PATENT DOCUMENTS

| 5,555,404 A | 9/1996 | Torbjornsen et al. |
| 5,832,514 A | 11/1998 | Norin et al. |

(Continued)

FOREIGN PATENT DOCUMENTS

WO  WO-2010148415 A1 * 12/2010 ......... G06F 16/2282

OTHER PUBLICATIONS

Cretu, et al., "Event-Driven Replication in Distributed Systems", Proceedings of the 4th India Software Engineering Conference '11; Feb. 23-26, 2011; pp. 95-98.

(Continued)

*Primary Examiner* — Alford W Kindred
*Assistant Examiner* — Lin Lin M Htay
(74) *Attorney, Agent, or Firm* — Cantor Colburn LLP; Richard Wilhelm (57) ABSTRACT

Embodiments relate to generating database sequences in a replicated database environment. An aspect includes providing a group of nodes each hosting an instance of a replicated database, with one node in the group elected as a master node responsible for generating and distributing values for auto-generated values in a column or row of the replicated database. Another aspect includes dividing, by the master node, a sequence space of possible auto-generated values for the column or row into sub-ranges and assigning a sub-range to a particular node in the group of nodes. Another aspect includes distributing, by the master node, values of the assigned sub-range to a particular node of the group of nodes.

16 Claims, 7 Drawing Sheets

(56) References Cited

U.S. PATENT DOCUMENTS

| | | | |
|---|---|---|---|
| 6,363,396 B1* | 3/2002 | Klots | G06F 9/52 |
| 6,615,223 B1 | 9/2003 | Shih et al. | |
| 6,662,196 B2 | 12/2003 | Holenstein et al. | |
| 6,920,454 B1* | 7/2005 | Chan | G06F 9/5061 |
| 7,177,866 B2 | 2/2007 | Holenstein et al. | |
| 7,269,648 B1 | 9/2007 | Krishnan et al. | |
| 7,461,130 B1 | 12/2008 | AbdelAziz et al. | |
| 7,478,263 B1 | 1/2009 | Kwonacki et al. | |
| 7,555,493 B2 | 6/2009 | Khayter et al. | |
| 7,598,854 B2 | 10/2009 | Wong | |
| 7,627,611 B2 | 12/2009 | Gusciora | |
| 7,627,622 B2 | 12/2009 | Gusciora | |
| 7,827,136 B1 | 11/2010 | Wang et al. | |
| 7,962,458 B2 | 6/2011 | Holenstein et al. | |
| 8,086,661 B2 | 12/2011 | Holenstein et al. | |
| 8,326,899 B2 | 12/2012 | Harvey et al. | |
| 9,846,733 B2 | 12/2017 | Dennehy et al. | |
| 2005/0198074 A1 | 9/2005 | Khayter et al. | |
| 2006/0155778 A1 | 7/2006 | Sharma et al. | |
| 2007/0112791 A1 | 5/2007 | Harvey et al. | |
| 2007/0112877 A1 | 5/2007 | Harvey et al. | |
| 2007/0140239 A1* | 6/2007 | Bauer | H04L 61/6009 370/389 |
| 2008/0165704 A1 | 7/2008 | Marchetti et al. | |
| 2008/0175387 A1 | 7/2008 | Eastham | |
| 2008/0222159 A1* | 9/2008 | Aranha | G06F 16/21 |
| 2008/0270363 A1 | 10/2008 | Hunt et al. | |
| 2010/0250589 A1 | 9/2010 | Tsai | |
| 2012/0166390 A1 | 6/2012 | Merriman et al. | |
| 2013/0144842 A1* | 6/2013 | Li | G06F 16/24552 707/674 |

OTHER PUBLICATIONS

Filip, et al. "Considerations about an Oracle Database Multi-Master Replication" SACI '09, 5th Internation Symposium on Applied Computational Intelligence and Informatics; May 28-29, 2009; pp. 147-152.

Moiz, et al., "Database Replication: A Survey of Open Source and Commercial Tools", International Journal of Computer Applications (0975-8887), vol. 13—No. 6, Jan. 2011; 8 pages.

Microsoft "Replicate Identity Columns", retrieved from: http://msdn.microsoft.com/en-us/library/ms152543(d=printer).aspx; downloaded on Apr. 10, 2013; 4 pgs.

* cited by examiner

GENERATING DATABASE SEQUENCES IN A REPLICATED DATABASE ENVIRONMENT

FOREIGN AND DOMESTIC PRIORITY

This application is a continuation of U.S. patent application Ser. No. 13/939,723, filed Jul. 11, 2013, which claims priority to United Kingdom application No. 1212772.6, with United Kingdom filing date of Jul. 18, 2012, and all the benefits accruing therefrom under 35 U.S.C. § 119, the contents of which in its entirety are herein incorporated by reference.

BACKGROUND

This disclosure relates generally to generating database sequences, and more particularly to generating database sequences in a replicated database environment. When a database table contains a column that utilizes an auto-generated value (for example, identity, sequences, etc.), this value is usually generated by the database management system (DBMS). This is at odds with the general set of row data that is usually explicitly supplied by a user as part of an INSERT operation. Auto-generated values are frequently used to ensure the uniqueness of rows and are therefore often used as a PRIMARY KEY to the table.

Imagine a table called bookTable with two columns, bookID and bookName. When adding row data to bookTable it is desirable to ensure that each row is unique for referential integrity and consistency purposes. A situation may be envisaged where two books exist with the same name. Therefore what ensures the uniqueness of a book in the bookTable is the bookID. From a user perspective, it is not necessary to be concerned with the books' bookID, it only matters that they are different and as such represent two individual books. In this instance, a constraint may be assigned to the database which ensures that each insert into bookTable is provided with a unique ID and that the unique ID (bookID in this instance) need not be supplied as part of the INSERT operation.

Two consecutive INSERT operations may be executed:
$ INSERT INTO TABLE bookTable VALUES ("My Book");
>bookID bookName
1 MyBook
$ INSERT INTO TABLE bookTable VALUES ("My Book");
>bookID bookName
1 MyBook
2 MyBook Handling even the trivial configurations poses a significant problem when replicating data. Today, when performing full active-active database replication i.e. where write workloads can be executed on both nodes, special care must be taken where auto-generated table data is concerned. The problem is illustrated in the most basic sense in FIG. 1.

Figure 1:
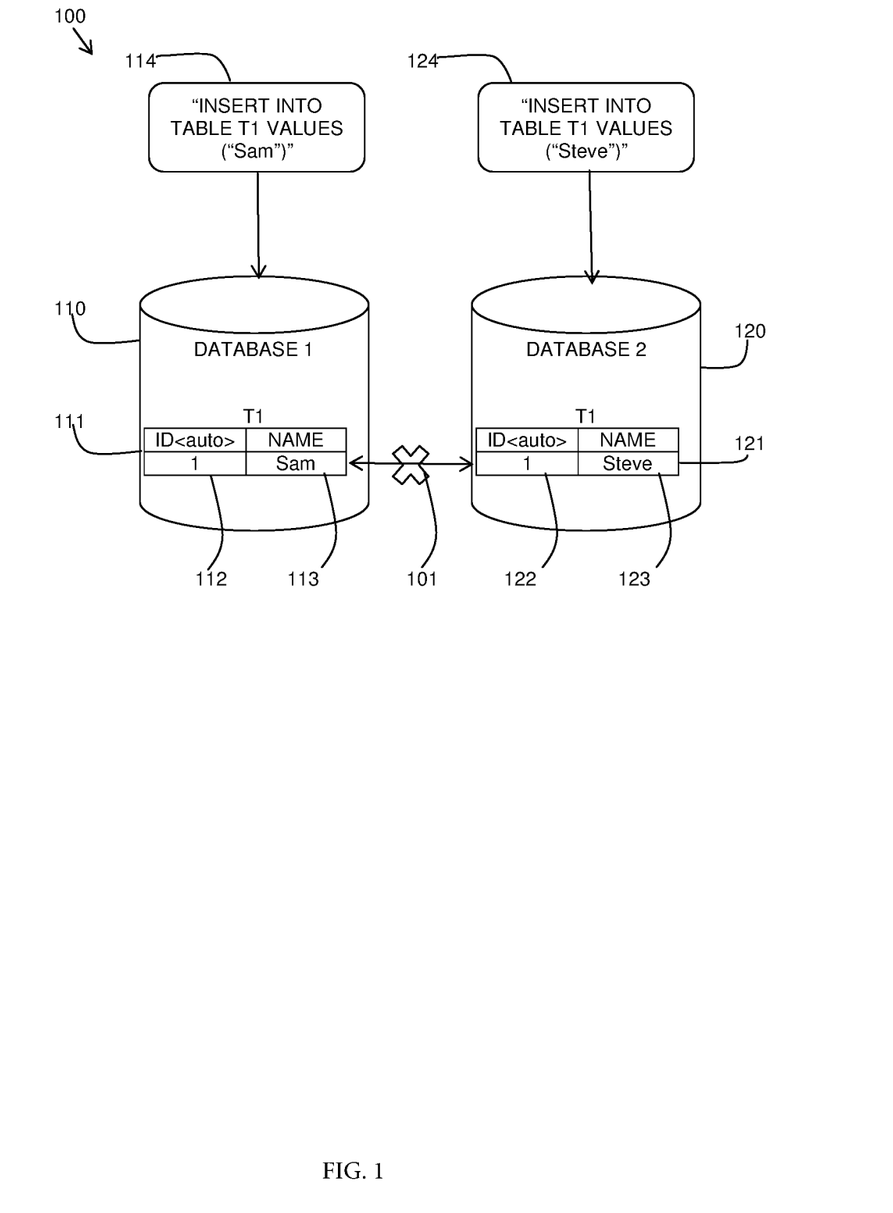
FIG. 1 is a block diagram of a replicated database.

FIG. 1 shows a replicated database system 100 with a first database 110 and a second database 120. The first and second databases 110, 120 both have a table T1 111, 121 with an automatically generated ID field 112, 122 and a name field 113, 123. In this example, the values inserted 114, 115 in the name fields 112, 122 differ as the first database 110 has the name "Sam" and the second database 120 has the name "Steve". However, the automatically generated ID fields 112, 122 have the same value of "1" causing a conflict 101 in the replication.

The most simplistic form of the problem occurs when the following conditions exist: bidirectional replication is configured between one or more nodes; any value in the replicated table-set is auto-generated by the database system. Examples are integer based identity values and sequences; and an insert related operation is executed on the same table on more than one of the replicated nodes at approximately the same time, i.e. in a time less than the sum of the transmission time between nodes and the commit time per node.

The above scenario is highly likely in high transactional environments ("hot" tables) i.e. where writes are occurring at a high frequency on the same table on both replicated nodes at the same time (load balanced environment). Under these conditions collision recovery algorithms are required which ultimately degrade the transactional performance of all systems.

The problem is further exacerbated when the number of replicating database increases. A way to distribute an auto-generated value range is required via a means that can tolerate fault in any of the replicated node set.

SUMMARY

In one aspect, a method for generating database sequences in a replicated database environment is provided. An aspect includes providing a group of nodes each hosting an instance of a replicated database, with one node in the group elected as a master node responsible for generating and distributing values for auto-generated values in a column or row of the replicated database. Another aspect includes dividing, by the master node, a sequence space of possible auto-generated values for the column or row into sub-ranges and assigning a sub-range to a particular node in the group of nodes. Another aspect includes distributing, by the master node, values of the assigned sub-range to a particular node of the group of nodes.

In another aspect, a system for generating database sequences in a replicated database environment is provided. An aspect includes a group of nodes each hosting an instance of a replicated database, with one node in the group elected as a master node responsible for generating and distributing values for auto-generated values in a column or row of the replicated database. Another aspect includes the master node comprising a sub-range allocating component that divides a sequence space of possible auto-generated values for the column or row into sub-ranges and assigning a sub-range to a particular node in the group of nodes. Another aspect includes the master node further comprising a demand receiving and value generating component that distributes values of the assigned sub-range to a particular node.

In another aspect, a computer program product for generating database sequences, the computer program product comprising a computer readable storage medium having computer-readable program code embodied therewith. An aspect includes dividing, in a replicated database environment having a group of nodes each hosting an instance of a replicated database, with one node in the group elected as a master node responsible for generating and distributing values for auto-generated values in a column or row of the replicated database, a sequence space of possible auto-generated values for the column or row into sub-ranges and assigning a sub-range to a particular node in the group of nodes. Another aspect includes distributing values of the assigned sub-range to a particular node of the group of nodes.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of generating database sequences in a replicated database environment are provided, with exemplary embodiments being discussed below in detail. Method and system are provided for generating database sequences in a replicated database environment in which a master node divides a range of auto-generated values into sub-ranges and assigns and distributes a sub-range to each other replicating node in a network. Sequence ranges are automatically assigned to each node in the replicated system so that conflicts cannot arise and therefore no conflict resolution algorithm is required. Various embodiments may further enable assignment and distribution by a new master node of sub-ranges after a partition or node failure without conflict with the existing sub-ranges.

The described embodiments handle network partition or node failure by dividing the sequences between the remaining nodes or network partitions after a node failure or network partition, and permitting a distributed system which has undergone partition failure to remain able to generate unique sequence elements. This permits graceful recovery once the network partition or node failure is resolved.

Figure 2:
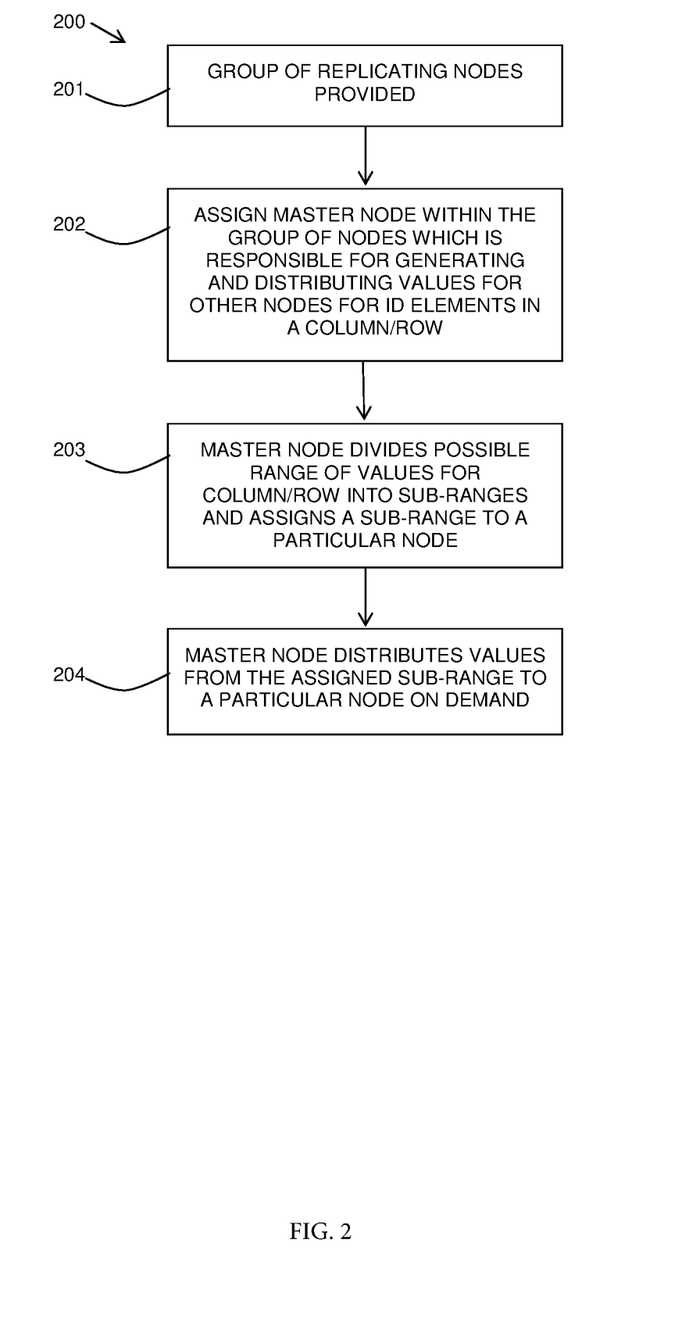
FIG. 2 is a flow diagram of an example embodiment of an aspect of a method for generating database sequences in a replicated database environment.

Referring to FIG. 2, a flow diagram 200 shows an example embodiment of a method for generating database sequences in a replicated database environment. A group of nodes are provided 201 with bi-directional replication for databases where more than one node can create records in a replicated table.

A master node within the group of nodes may be assigned 202. This may be through an election or assignment process during initial start-up or by some other means. The master node is responsible for generating and distributing values for itself and the other nodes from a sequence space of auto-generated elements in a column/row of a replicated table. The auto-generated elements may be identities and sequences, etc.

The described method relates to identity values that can be apportioned into separate groupings, i.e. sequences of numbers, value sub-ranges etc. This only requires that the range size can be pre-determined before the sub-ranges are calculated. The master node may divide 203 a possible range of auto-generated values for a given column/row into sub-ranges and may assign a sub-range to a particular node. The sub-ranges may vary in size. The master node may distribute 204 values from the assigned sub-range to a particular node on demand.

Figure 3:
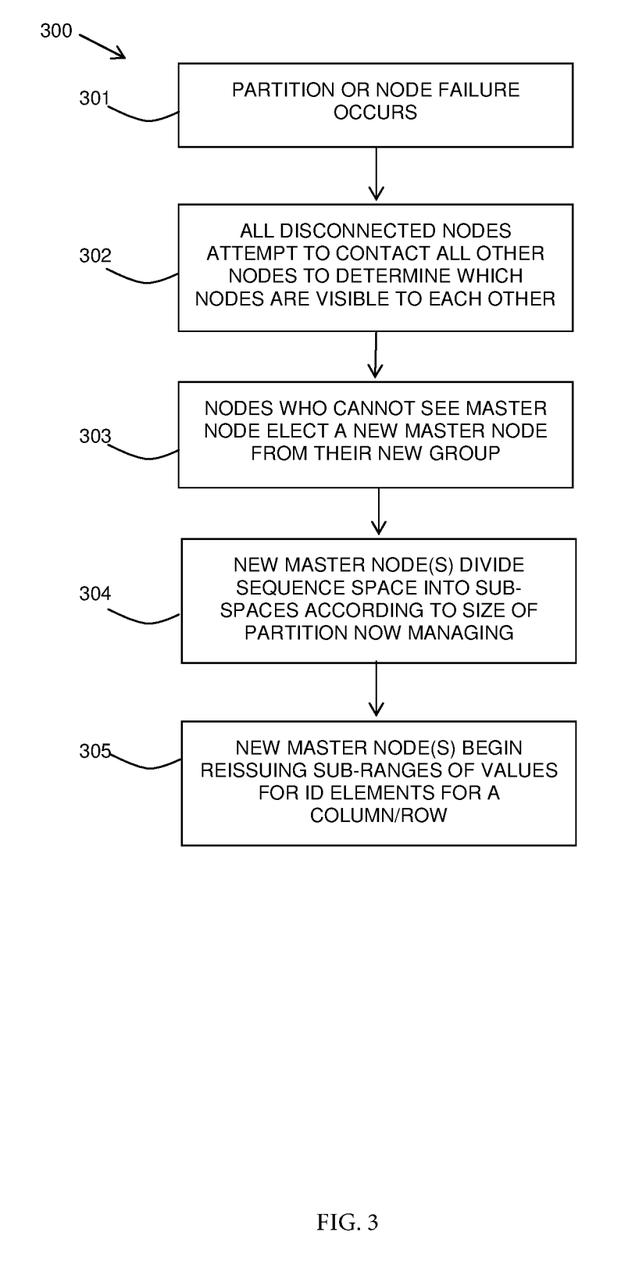
FIG. 3 is a flow diagram of an example embodiment of an aspect of a method for generating database sequences in a replicated database environment.

Referring to FIG. 3, a flow diagram 300 shows an example embodiment of a method for generating database sequences in a replicated database environment during partition or node failure 301. All disconnected nodes may attempt 302 to contact all other nodes to determine which nodes are visible to each other. Nodes that cannot see the master node may elect 303 a new master node from within their new group. Once the new master node or nodes have been elected, they may divide the sequence space of auto-generated values into sequence sub-spaces 304 amongst themselves according to the size of the partitions the master node or nodes is now managing. The new master node or nodes may begin 305 re-issuing sub-ranges of values for ID elements for a column/row to particular nodes from its sub-space of possible values.

Figure 4:
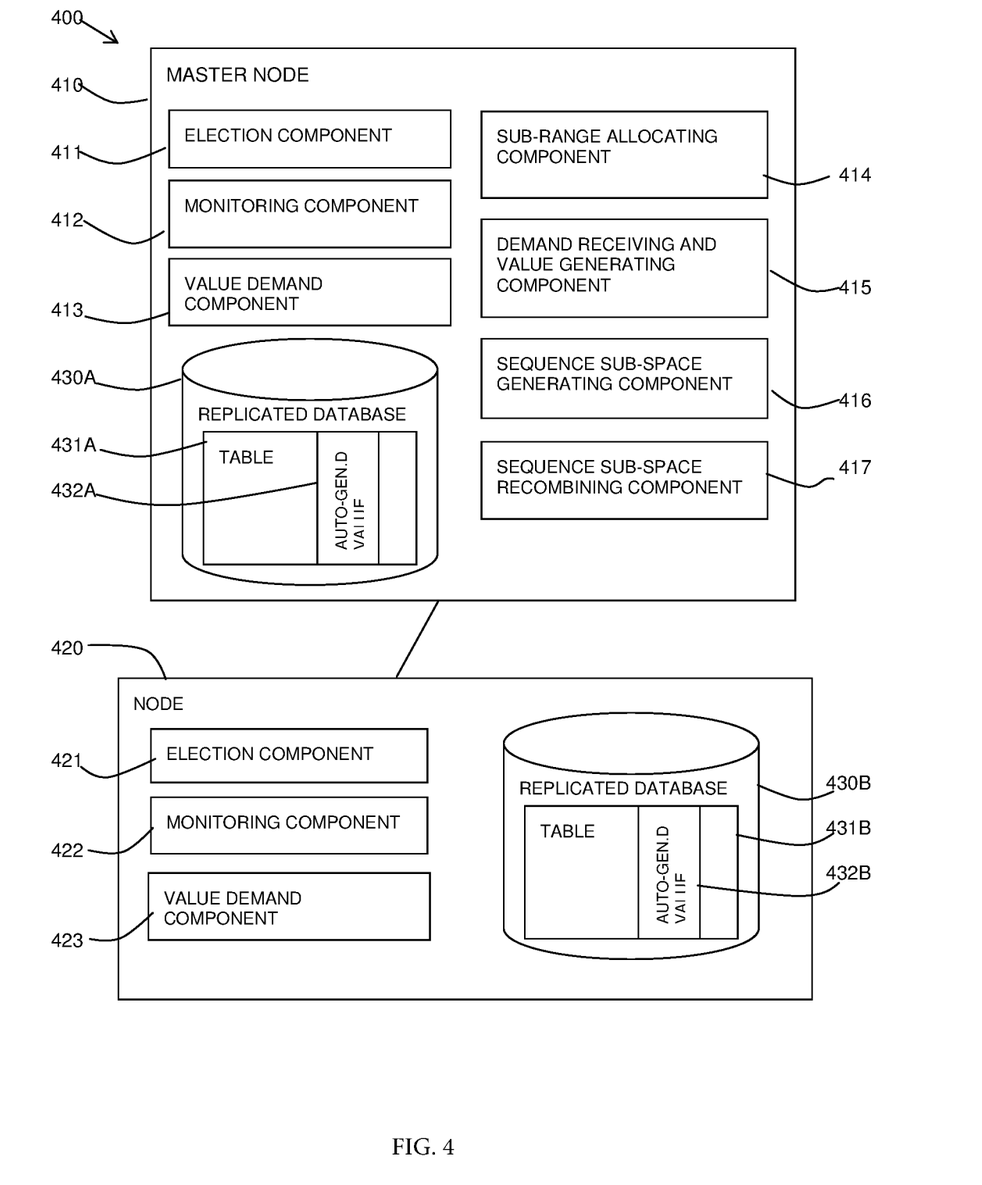
FIG. 4 is block diagram of an example embodiment of a system for generating database sequences in a replicated database environment.

Referring to FIG. 4, an example embodiment of a system 400 for generating database sequences in a replicated database environment is shown. A group of nodes is provided in a network. The group elects a master node 410 and the remaining nodes 420 non-master nodes (one shown in FIG. 4). The nodes may be geographically distant or members of the same local cluster and may contain any number of nodes. The nodes 410, 420 each host an instance of a replicated database 430A,B which contains a table 431A,B with a column/row 432A,B with an auto-generated value.

All the nodes 410, 420 (including the master node 410) may include an election component 411, 421 for electing a master node for a group, and a monitoring component 412, 422 for monitoring the contact with the other nodes. They may also include a value demand component 423 for demanding an auto-generated value for the column 432A, B of the replicated database 430A, B.

The master node 410 may further include a sub-range allocating component 414 for dividing a sequence space for auto-generated values into sub-ranges and allocating the sub-ranges to the nodes 410, 420 in the group, including itself. The master node 410 may include a demand receiving and value generating component 415 for receiving demands for an auto-generated value from a node 410, 420 and generating an auto-generated value for the node 410, 420 from the allocated sub-range. The master node 410 may also include a sequence sub-space generating component 416 for dividing the sequence space for auto-generated values into sub-spaces when a group is divided into sub-network groups by a partition or node failure. The master node 410 may also include a sequence sub-space recombining component 417 for recombining the sub-spaces when one of more nodes 420 rejoins a group.

Figure 5:
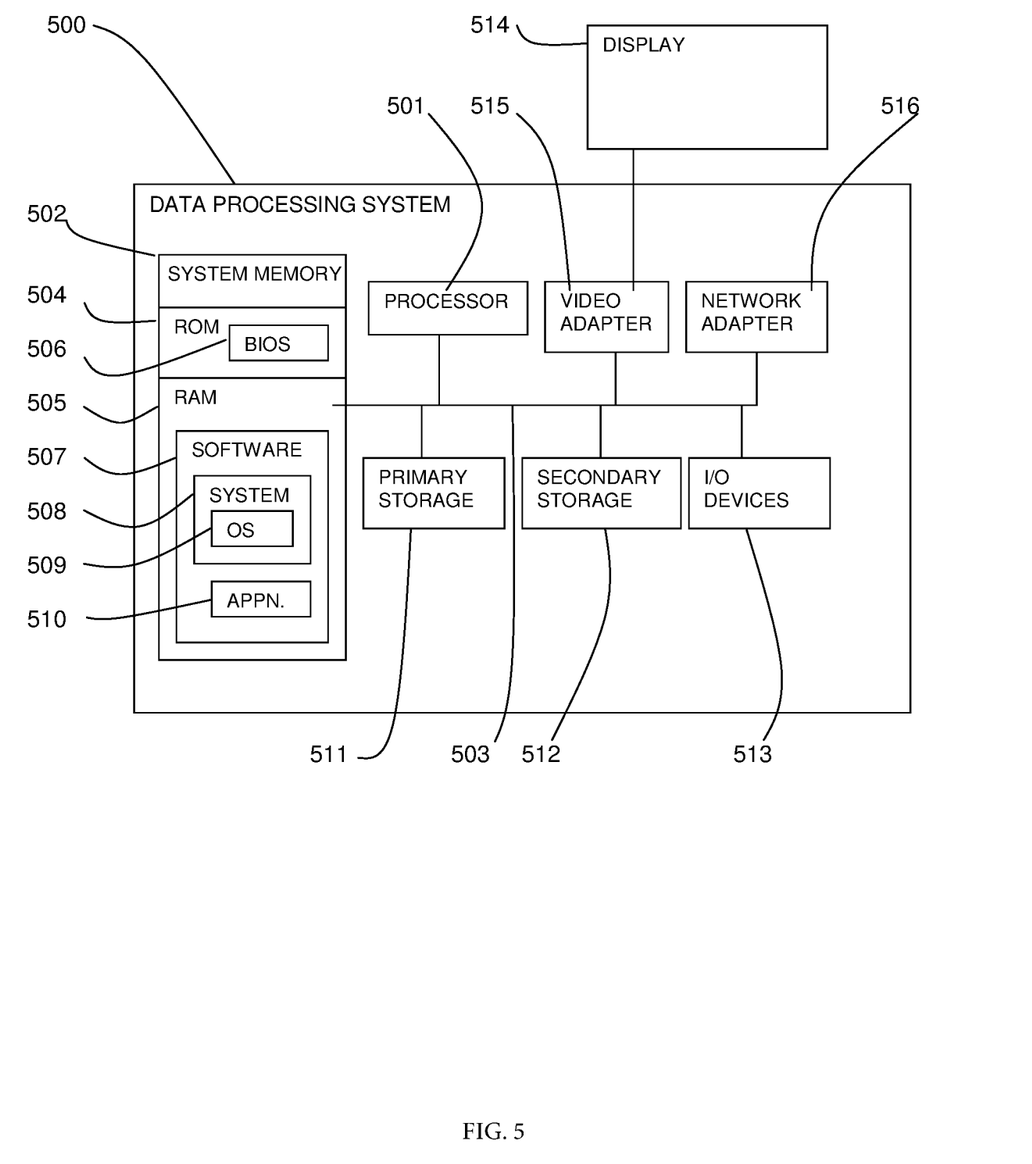
FIG. 5 is a block diagram of an embodiment of a computer system in which generating database sequences in a replicated database environment may be implemented.

Referring to FIG. 5, a system for implementing generation of database sequences in a replicated database environment includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RANI 505 including operating system software 508. Software applications 510 may also be stored in RANI 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516. Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Figure 6A:
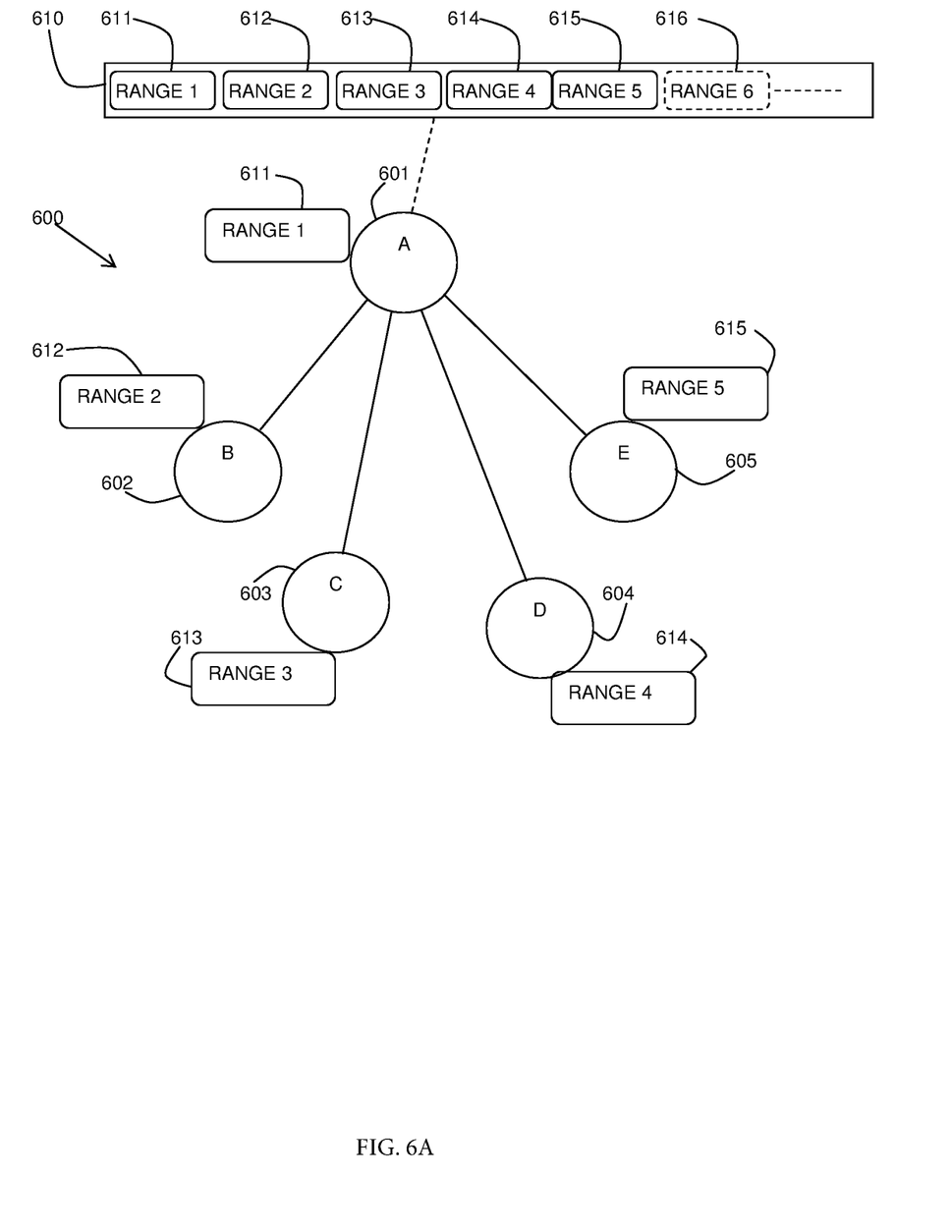
FIGS. 6A and 6B are schematic diagrams illustrating a system for generating database sequences in a replicated database environment.
Figure 6B:
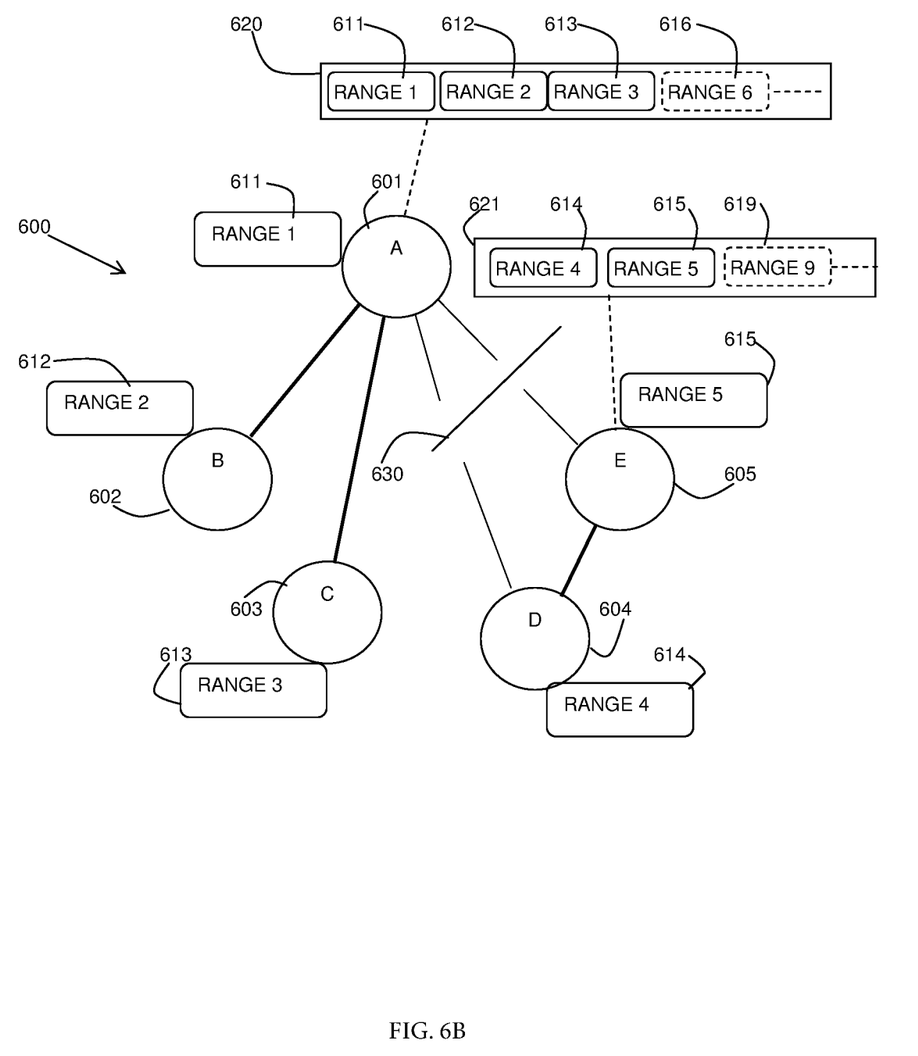

Referring to FIGS. 6A and 6B, schematic diagrams show an example embodiment of a system for generating database sequences in a replicated database environment. FIGS. 6A and 6B show distributed system with a group 600 of nodes 601-605 (nodes A to E). The nodes may be geographically distant or members of the same local cluster and may contain any number of nodes. The nodes 601-605 each host an instance of a replicated database which contains a table T1 with a column/row with an auto-generated value. Each node 601-605 is capable of accepting write requests to Table T1 (locally) which are subsequently replicated to all other nodes in the replication group via a master node.

Master Election:

A master node is elected or assigned during initial start-up by means of an election algorithm amongst the nodes or some other means. FIG. 6A, this is node A 601. The master node 601 generates sequence/unique identity elements for the other nodes 602-605 in the network and thus ensures the uniqueness of the generated values/ids. In this instance, the master node 601 is generating values which will be used on a single column/row on table T1. The master node 601 also monitors the network to ensure that all nodes 602-605 remain in contact with the master node 601. All nodes 601-605 in the network maintain a full list of all nodes 601-605 on the network.

Range/Value Distribution:

The master node 601 is responsible for generating and distributing values to the participants in the replication set i.e. all nodes 601-605 replicating table T1. Consider that the range 610 of possible values for a single auto-generated column is 0 . . . N. The master node 601 divides up that possible range into sub-ranges 611-615, and assigns the values in a sub-range 611-615 to a particular node 601-605.

A value sub-range 611-615 is assigned to a participant node 601-605 and each participant node may then assign values within that sub-range 611-615. FIG. 6A illustrates that sub-ranges of values may be distributed to the participant nodes 601-605, on demand. In the illustrated example, Range 1 611, Range 2 612, Range 3 613, Range 4 614 and Range 5 615 have been distributed from the master node A 601 to itself and nodes B 602, C 603, D 604 and E 605 respectively. Master node A 601 apportions sub-ranges of values to the participant nodes 601-605. These sub-ranges may be of fixed size or variable size. Each sub-range 611-615 contains a continuous list of values that can be used as values in table T1 and since they have been distributed from a superset 610 of values maintained on the master node 601, uniqueness is guaranteed.

In some embodiments, each node 601-605 can be set to exhaust the values that have been supplied to it before a further sub-range value request can be made to the master node 601. When further requests are made, additional sub-ranges 616 may be apportioned. In further embodiments, once any of the nodes exhaust their allocated range, it may automatically move to the corresponding range in the next sub-range i.e. 616. There may be no communication needed between the master and participants to do this.

The master node 601 is a participant in the replication process and as such can apportion auto-generated value sub-ranges 611 to itself. As the sub-ranges 611-615 may be of variable size, nodes which are allocating values faster than other nodes may be assigned larger sub-ranges for greater performance. If any node experiences a higher demand than its peers it can communicate with the master node to negotiate a larger allocation of the sub-ranges (from that point forwards) to itself.

The master range 610 is bounded by the underlying hardware specification. In practice, the master range 610 may be divided into a number of intermediate ranges in the form of a single block of values which is then sub-divided and apportioned to participant nodes. For example, in FIG. 6A an intermediate range would encompass sub-ranges 611-615 and in the first instance 611-615 are allocated to nodes A-E respectively.

Partition or Node Failure:

In the event of a network partition or a node failure, all disconnected nodes attempt to contact all other nodes to determine what nodes are now visible to one another. Those nodes which can no longer see the master node then elect a new master node.

In the example of FIGS. 6A and 6B, FIG. 6B shows that nodes D 604 and E 605 have become disconnected 630 from node A 601 (the master) while nodes B 602 and C 603 remain connected. This results in a new master node for a partitioned segment of the distributed system. If a node can still see the old master node, it will refuse to approve bids to become the new master node from other nodes and it will make no bids to become the new master node itself in order to maximize the size of the original master node's segment of the system after the partition. Therefore in the example shown, node A 601 remains the master node and a new master node is elected at node E 605.

Fault Tolerance: Splitting the Sequence Range:

Once the new master node 605 (node E) or nodes have been elected, they will begin reissuing sequence elements, dividing the sequence space 610 into sequence sub-spaces 620, 621 amongst themselves according to the size of the partitions the master node or nodes is now managing:

$$S=(s_1, s_2, s_3, \ldots, s_{max}) \qquad \text{(EQ. 1)}$$

$$S_{terms}=[1,2,3, \ldots, max] \qquad \text{(EQ. 2)}$$

For two partitions:

$$S_{terms}=[1,2,3,\ldots,max] \quad (EQ.\ 3)$$

$$S_{terms}^{1}=[1,2,3,\ldots,P]aN \quad (EQ.\ 4)$$

$$S_{terms}^{2}=[P+1,P+2,3,\ldots,N]aN \quad (EQ.\ 5)$$

Wherein:

$S_{terms}$ is the full range of values on the master node (1 ... max); P is the size of the sub-range (or number of contiguous values) that the master node distributes to a node per request;

N is the chosen number of sub-ranges;

$S_{terms}^{1}$ is all of the values in the master range that will be assigned to the first partition;

$S_{terms}^{2}$ is all of the values in the master range that will be assigned to the second partition; and a is the sub-range number. Therefore $S_{terms}$ is equal to the sum of $S_{terms}^{1}$ and $S_{terms}^{2}$.

In FIG. 6B, neither node D 604 nor node E 605 can communicate with node A 601. In this instance, the new subgroup (node D, node E) assumes that all other nodes have remained with the old network with node A as master.

When a network partition occurs, and node D 604 and node E 605 are disconnected from node A 601, node A 601 locks the range allocations of node D 604 and node E 605. This is so that future dynamic reallocation by node A 601 does not affect the ranges of values allocated to node D 604 and node E 605 at the time of the network partition. In doing so, this allows later reintegration of node D 604 and node E 605 with node A 601 without a risk of value collision.

When node E 605 is elected as the new master node for the sub-group containing node D 604 and node E 605, node E 605 is free to perform dynamic range reallocation within the bounds of the ranges assigned to the participant nodes within the sub-group prior to the network partition.

As shown in FIG. 6B, when the sub-network of nodes A-B-C 601, 602, 603 has used all values in Ranges 1-3, the next apportioned range will be Range 6 616. Whilst the sub-network of nodes E-D 605, 604 will begin with Range 9 619, thus avoiding collision.

While issuing sequence elements from their respective sub-spaces of the sequence space, the original master node (node A) 601 and the new master node (node E) 605 continue to monitor the network for one another periodically to detect a rectification of the network partition fault.

Re-joining a Disconnected Sequence Range:

Should rectification occur, the sequence sub-spaces 620, 621 are recombined and the original master node (node A) 601 re-asserts its master node status. The sub-spaces 620, 621 are reintegrated in an additive manner; however each node (nodes D and E) 604, 605 in the sub-network created by the network partition fault originally, must reconnect with the original master node (node A) 601. Any nodes which cannot see the original master node, must form another sub-network and that sub-network must elect a new master node, which will take over a new sub-section of the sequence space.

So in this example, if node E 605 rejoins the sub-network of nodes A-B-C 601, 602, 603, node A 601 increases the size of its sequence sub-space 620, while D elects itself a master node and claims a smaller portion of the sequence sub-space 621 which had been claimed by node E 605. This requires a message from node E 605 to node D 604 indicating that node E 605 is re-joining the node A-B-C 601, 602, 603 sub-network, lest node D 604 believe that node E 605 is still its master node. An alternative implementation would permit sub-network of nodes E-D 605, 604 to rejoin sub-network of nodes A-B-C 601, 602, 603 using node E 605 as a gateway to node D 604.

Possible use cases may include, but are not limited to, the following:

any multi-node bi-directional (active-active) replication solution for databases where more than one node can create records, and automatic values are generated for any columns in records;

high availability database clusters for website services, where demand is too high for a single database node to handle, but where records must have unique identifiers (which multiple database nodes creating records at will could not guarantee); for example, Twitter (Twitter is a trade mark of Twitter, Inc.) or similar services;

fault-tolerant database clusters, where network partition faults must not affect the ability to create records with unique identifiers; and as a support mechanism in a design for a multi-node database cluster which does not utilize the traditional master-secondary topography where only one node may create records but all nodes may allow reads of those records.

Various embodiments implement the handling of auto-generated column/row values in a bi-directional replication scenario in a fault-tolerant fashion. It also allows instances to continue as normal with little performance impact while eliminating collisions on identity/sequences. In addition, other alternatives to eliminating collisions are much more expensive from implementation/performance perspectives (e.g. distributed lock, 2-phase commit, multi-node coordination) and fall down when there is a network fault between nodes. In contrast, this solution allows the various database nodes to continue with small overhead, even with network failure while at same time supporting replication.

Various embodiments may be lock-free with respect to unique ID creation/handling. It is based on the concept of predetermined/adjustable unique/ID sequence range assignment and as such is classifiable as collision avoidance rather than collision resolution.

Various embodiments are tolerant of partial network faults with respect to unique ID assignment, i.e. that any member node in the multi-master replication cluster can continue to generate new IDs without potential unique ID collisions even when that node is disconnected from the network.

Using the various embodiments, auto-generated column values can be handled in a replicated database configuration without pre-assigning range values. Auto-generated values are also fairly distributed across the replicated nodes. There is no manual configuration required.

Various embodiments can take the form of an entirely hardware embodiment, an entirely software embodiment or an embodiment containing both hardware and software elements. Some embodiments may be implemented in software, which includes but is not limited to firmware, resident software, microcode, etc.

Various embodiments can take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for generating database sequences in a replicated database environment, comprising:
   providing a group of nodes each hosting an instance of a replicated database, with one node in the group elected as a master node responsible for generating and distributing values for auto-generated values in a column or row of the replicated database;
   dividing, by the master node, a sequence space of possible auto-generated values for the column or row into sub-ranges and assigning a sub-range to a particular node in the group of nodes;
   recombining, by the processor, the sub-network group when one or more of the group of nodes rejoins the group of nodes, wherein recombining comprises:
      determining, by the processor, whether any one or more of the group of nodes is unable to reconnect with the master node;
      forming a sub-network comprising the one or more of the group of nodes unable to reconnect with the master node; and
      electing, by the processor, a new master node for the sub-network; and
   distributing, by the master node, values of the assigned sub-range to a particular node of the group of nodes,
   electing, by the new master node, a sub-range having a smaller portion of a sequence of sub-space than the portion claimed by the master node;
   dividing, by an original and new master node or nodes, the sequence space of possible auto-generated values into sub-spaces for each group of nodes according to a size of each group of nodes, and for the new master node or nodes, assigning a sub-range for a particular node in the group of nodes,
   wherein the new master node or nodes re-issue sub-ranges of values for ID elements for a column or row to particular nodes from possible values of the sub-spaces associated with new master node or nodes, and
   wherein the sub-ranges are of variable size, and wherein a size of a sub-range that is assigned to a node is determined based on a speed of allocation of values by the nodes, such that a node which is allocating values faster than other nodes is assigned a larger sub-range than the other nodes.

2. The method of claim 1, comprising:
   detecting a partition or node failure in the group of nodes;
   determining new groups of nodes and electing the new master node in a group of nodes which cannot see an original master node; and
   the new master node or nodes assigning a sub-range for a particular node in the group of nodes.

3. The method of claim 2, wherein the original master node and a new master node monitor a network for one another periodically to detect a rectification of a network partition fault.

4. The method of claim 3, wherein based on rectification of the network partition fault occurring, recombining the sequence sub-spaces and reasserting the original master node in the master node role.

5. The method of claim 3, wherein based on a new master node re-joining a group of nodes, the new master node indicates to any other nodes in the new master node's group that it is no longer its master node.

6. The method of claim 3, wherein a new group of nodes re-joins a previous group of nodes using the new group's master node as a gateway to the original master node.

7. The method of claim 1, wherein a node exhausts a sub-range of values before requesting a further sub-range of values.

8. The method of claim 1, wherein the master node assigns and distributes a sub-range of values for itself.

9. The method of claim 1, wherein the group of nodes have bi-directional replication for databases where more than one node can create records in a replicated table.

10. A computer-implemented system for generating database sequences in a replicated database environment, comprising:
   a group of nodes each hosting, by a processor at each node, an instance of a replicated database, with one node in the group elected as a master node responsible for generating and distributing values for auto-generated values in a column or row of the replicated database;
   the master node comprising a sub-range allocating component that divides, by the processor on the master node, a sequence space of possible auto-generated values for the column or row into sub-ranges and assigning, by the processor on the master node, a sub-range to a particular node in the group of nodes and recombines the sub-network group when one or more of the group of nodes rejoins the group of nodes, wherein the processor is configured to:
   determine whether any one or more of the group of nodes is unable to reconnect with the master node;
   form a sub-network comprising the one or more of the group of nodes unable to reconnect with the master node; and
   elect a new master node for the sub-network; and
   the master node further comprising a demand receiving and value generating component that distributes values of the assigned sub-range to a particular node, wherein the new master node elects a sub-range having a smaller portion of a sequence of sub-space than the portion claimed by the master node; and wherein an original and new master node or nodes divides the sequence space of possible auto-generated values into sub-spaces for each group of nodes according to a size of each group of nodes, and for the new master node or nodes, assigns a sub-range for a particular node in the group of nodes, wherein the new master node or nodes re-issue sub-ranges of values for ID elements for a column or row to particular nodes from possible values of the sub-spaces associated with new master node or nodes, and wherein the sub-ranges are of variable size, and wherein a size of a sub-range that is assigned to a node is determined based on a speed of allocation of values by the nodes, such that a node which is allocating values faster than other nodes is assigned a larger sub-range than the other nodes.

11. The system of claim 10, wherein the master node includes:
a monitoring component that detects a partition or node failure in the group of nodes;
an election component that determines new groups of nodes and elects the new master node in a group of nodes which cannot see an original master node; and
a sequence sub-space generating component that divides the sequence space of possible auto-generated values into sub-spaces for each group of nodes according to the size of each group of nodes.

12. The system of claim 11, wherein the monitoring component of a master node monitors a network periodically to detect a rectification of a network partition fault.

13. The system of claim 11, wherein the master node comprises a sequence sub-space recombining component that recombines the sequence sub-spaces and reasserts the original master node in the master node role should rectification of a network partition fault occur.

14. The system of claim 10, wherein the master node assigns and distributes a sub-range of values for itself.

15. The system of claim 10, wherein the nodes of the group of nodes have bi-directional replication for databases where more than one node creates records in a replicated table.

16. A computer program product for generating database sequences, the computer program product comprising a non-transitory computer readable storage medium having computer-readable program code embodied therewith, the computer-readable program code configured to:
divide, in a replicated database environment having a group of nodes each hosting an instance of a replicated database, with one node in the group elected as a master node responsible for generating and distributing values for auto-generated values in a column or row of the replicated database, a sequence space of possible auto-generated values for the column or row into sub-ranges and assigning a sub-range to a particular node in the group of nodes; and
recombine, by the processor, the sub-network group when one or more of the group of nodes rejoins the group of nodes, wherein recombining comprises:
determining, by the processor, whether any one or more of the group of nodes is unable to reconnect with the master node;
forming a sub-network comprising the one or more of the group of nodes unable to reconnect with the master node;
electing, by the processor, a new master node for the sub-network; distribute values of the assigned sub-range to a particular node of the group of nodes;
distributing, by the master node, values of the assigned sub-range to a particular node of the group of nodes,
electing, by the new master node, a sub-range having a smaller portion of a sequence of sub-space than the portion claimed by the master node; and
dividing, by an original and new master node or nodes, the sequence space of possible auto-generated values into sub-spaces for each group of nodes according to a size of each group of nodes, and for the new master node or nodes, assigning a sub-range for a particular node in the group of nodes,
wherein the new master node or nodes re-issue sub-ranges of values for ID elements for a column or row to particular nodes from possible values of the sub-spaces associated with new master node or nodes, and
wherein the sub-ranges are of variable size, and wherein a size of a sub-range that is assigned to a node is determined based on a speed of allocation of values by the nodes, such that a node which is allocating values faster than other nodes is assigned a larger sub-range than the other nodes.

* * * * *